US010038387B2

(12) United States Patent
Yang

(10) Patent No.: US 10,038,387 B2
(45) Date of Patent: Jul. 31, 2018

(54) CONTROL CIRCUIT FOR ACTIVE CLAMP FLYBACK POWER CONVERTER WITH PREDICTED TIMING CONTROL

(71) Applicant: SEMICONDUCTOR COMPONENTS INDUSTRIES, LLC, Phoenix, AZ (US)

(72) Inventor: Ta-Yung Yang, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 361 days.

(21) Appl. No.: 14/251,899

(22) Filed: Apr. 14, 2014

(65) Prior Publication Data
US 2014/0307484 A1 Oct. 16, 2014

Related U.S. Application Data

(60) Provisional application No. 61/811,942, filed on Apr. 15, 2013.

(51) Int. Cl.
*H02M 3/335* (2006.01)
*H02M 1/34* (2007.01)

(52) U.S. Cl.
CPC .. *H02M 3/33569* (2013.01); *H02M 2001/342* (2013.01); *Y02B 70/1491* (2013.01)

(58) Field of Classification Search
CPC ............ H02M 3/335; H02M 3/33507; H02M 3/33523; H02M 3/33569; H02M 1/32; H02M 2001/0032
See application file for complete search history.

(56) References Cited

U.S. PATENT DOCUMENTS

| 5,570,278 A | 10/1996 | Cross |
| 6,069,803 A | 5/2000 | Cross |
| 7,016,204 B2 | 3/2006 | Yang et al. |
| 7,151,681 B2 | 12/2006 | Yang et al. |

(Continued)

FOREIGN PATENT DOCUMENTS

| CN | 102122890 A | 7/2011 |
| CN | 102208873 A | 10/2011 |

(Continued)

*Primary Examiner* — Nguyen Tran
*Assistant Examiner* — Monica Mata
(74) *Attorney, Agent, or Firm* — Robert F. Hightower

(57) ABSTRACT

A control circuit of a flyback power converter according to the present invention comprises a low-side transistor, an active-clamper, a high-side drive circuit, and a controller. The low-side transistor is coupled to switch a transformer. The active-clamper is coupled in parallel with the transformer. The high-side drive circuit is coupled to drive the active-clamper. The controller generates a switching signal and an active-clamp signal. The switching signal is coupled to drive the low-side transistor. The switching signal is generated in accordance with a feedback signal for regulating an output voltage of the flyback power converter. The active-clamp signal is coupled to control the high-side drive circuit and the active-clamper. The active-clamp signal is generated in response to a predicted time of the transformer. The predicted time is determined in accordance with an input voltage, the output voltage and an on time of the switching signal.

19 Claims, 16 Drawing Sheets

(56) References Cited

U.S. PATENT DOCUMENTS

| | | | |
|---|---|---|---|
| 7,349,229 B1 | 3/2008 | Yang | |
| 7,426,120 B2 | 9/2008 | Yang et al. | |
| 7,486,528 B2 | 2/2009 | Yang | |
| 7,616,461 B2 | 11/2009 | Yang et al. | |
| 7,671,578 B2 | 3/2010 | Li et al. | |
| 8,094,468 B2 | 1/2012 | Yang et al. | |
| 2007/0007938 A1* | 1/2007 | Djenguerian | H02M 3/33507 323/284 |
| 2008/0094047 A1* | 4/2008 | Huynh | H02M 3/33523 323/282 |
| 2011/0305048 A1 | 12/2011 | Yang et al. | |
| 2012/0069608 A1 | 3/2012 | Yang et al. | |
| 2012/0081084 A1 | 4/2012 | Yang et al. | |

FOREIGN PATENT DOCUMENTS

| | | |
|---|---|---|
| TW | 200922077 | 5/2009 |
| TW | 201014140 A | 4/2010 |

* cited by examiner

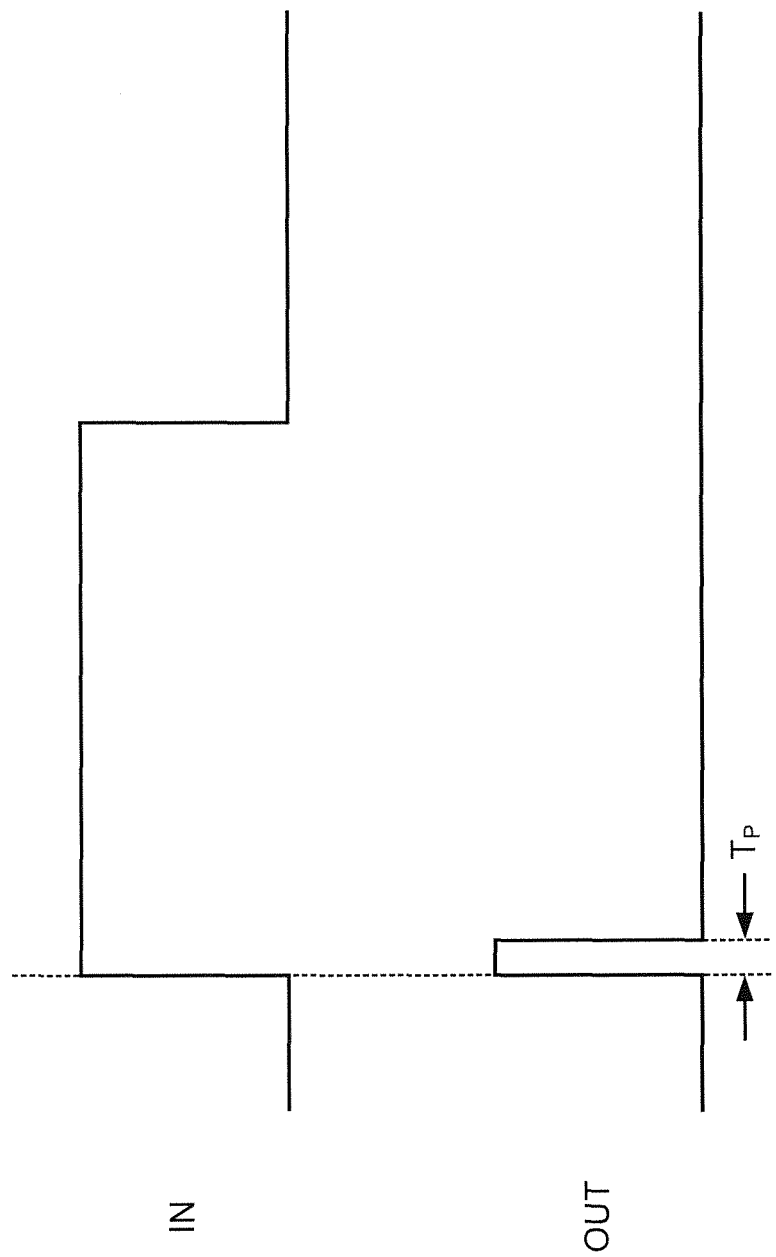

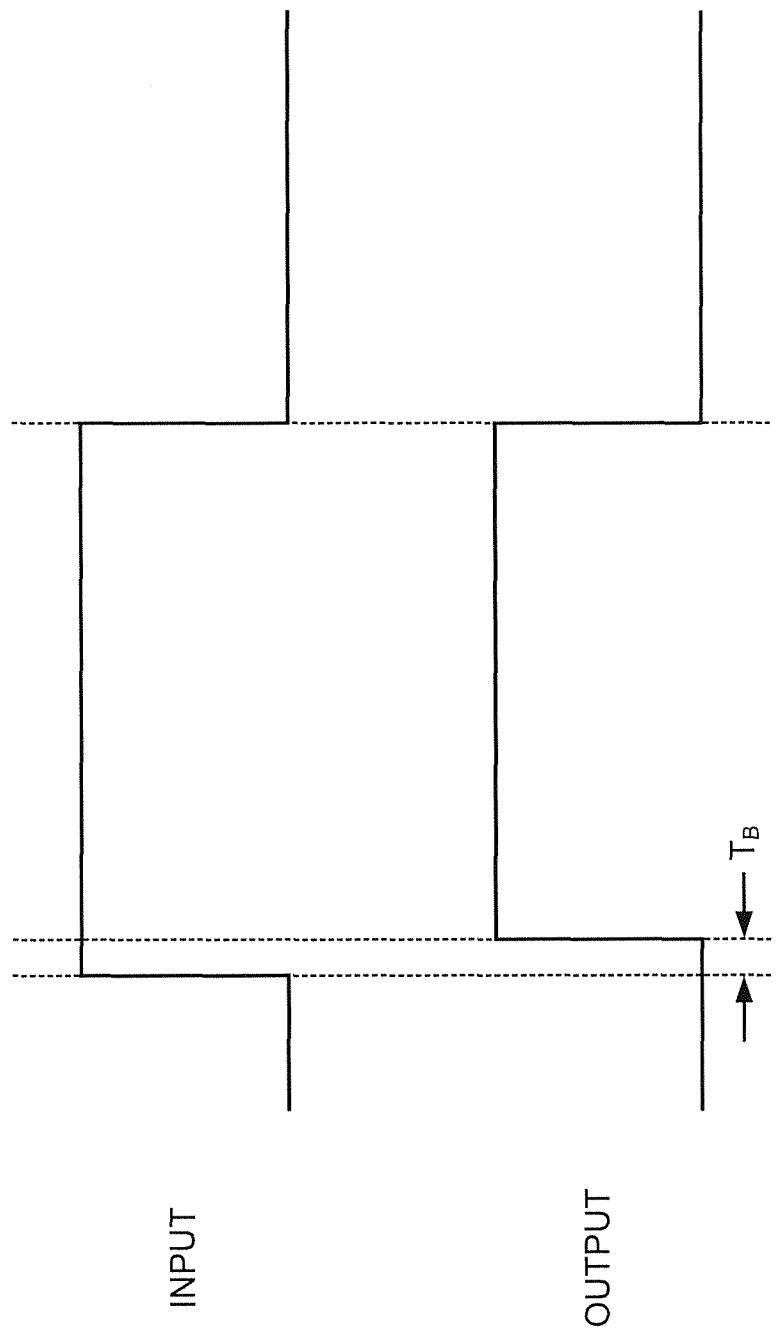

US 10,038,387 B2

CONTROL CIRCUIT FOR ACTIVE CLAMP FLYBACK POWER CONVERTER WITH PREDICTED TIMING CONTROL

This Application is based on Provisional Application Ser. No. 61/811,942, filed Apr. 15, 2013, and priority thereto is hereby claimed.

BACKGROUND OF THE INVENTION

Field of the Invention

The present invention relates to power converter, and more particularly, relates to the control circuit of the flyback power converter with active clamp.

Description of the Related Art

The flyback power converter with active-clamp circuit has been developed to increase the efficiency of the flyback power converter. Nevertheless, the traditional active-clamp circuit can only achieve high efficiency for the heavy load. The drawback of the traditional active-clamp circuit is the higher power loss at the light load because of the high circulated current. The objective of this invention is to improve the efficiency of the flyback power converter by recycling the leakage inductance's energy of the transformer in the light load, and achieve the soft switching for the heavy load. Therefore, the flyback power converter can be operated at higher switching frequency for reducing the size of the transformer. The related prior arts can be found in "Clamped continuous flyback power converter", U.S. Pat. No. 5,570,278; "Offset resonance zero voltage switching flyback converter", U.S. Pat. No. 6,069,803; and "Active-clamp circuit for quasi-resonant flyback power converter", U.S. patent application 20110305048.

BRIEF SUMMARY OF THE INVENTION

It is an objective of the present invention to provide a control circuit for the flyback power converter. It can make the flyback power converter achieve high efficiency in the heavy load and the light load.

It is an objective of the present invention to provide a control circuit for the flyback power converter. It can make the flyback power converter operate at higher switching frequency for reducing the size of its transformer.

The control circuit of the flyback power converter according to the present invention comprises a low-side transistor coupled to switch a transformer. An active-clamper is coupled in parallel with the transformer. A high-side drive circuit is coupled to drive the active-clamper. A controller generates a switching signal and an active-clamp signal. The switching signal is coupled to drive the low-side transistor. The switching signal is generated in accordance with a feedback signal for regulating an output voltage of the flyback power converter. The active-clamp signal is coupled to control the high-side drive circuit and the active-clamper. The active-clamp signal is generated in response to a predicted time of the transformer. The predicted time is determined in accordance with an input voltage, the output voltage and an on time of the switching signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

FIG. 6B shows the waveforms of the input signal IN and the output signal OUT of the pulse generator in accordance with the present invention.

FIG. 7B shows the waveforms of the input signal INPUT and the output signal OUTPUT of the delay circuit in accordance with the present invention.

DETAILED DESCRIPTION OF THE INVENTION

Figure 1:
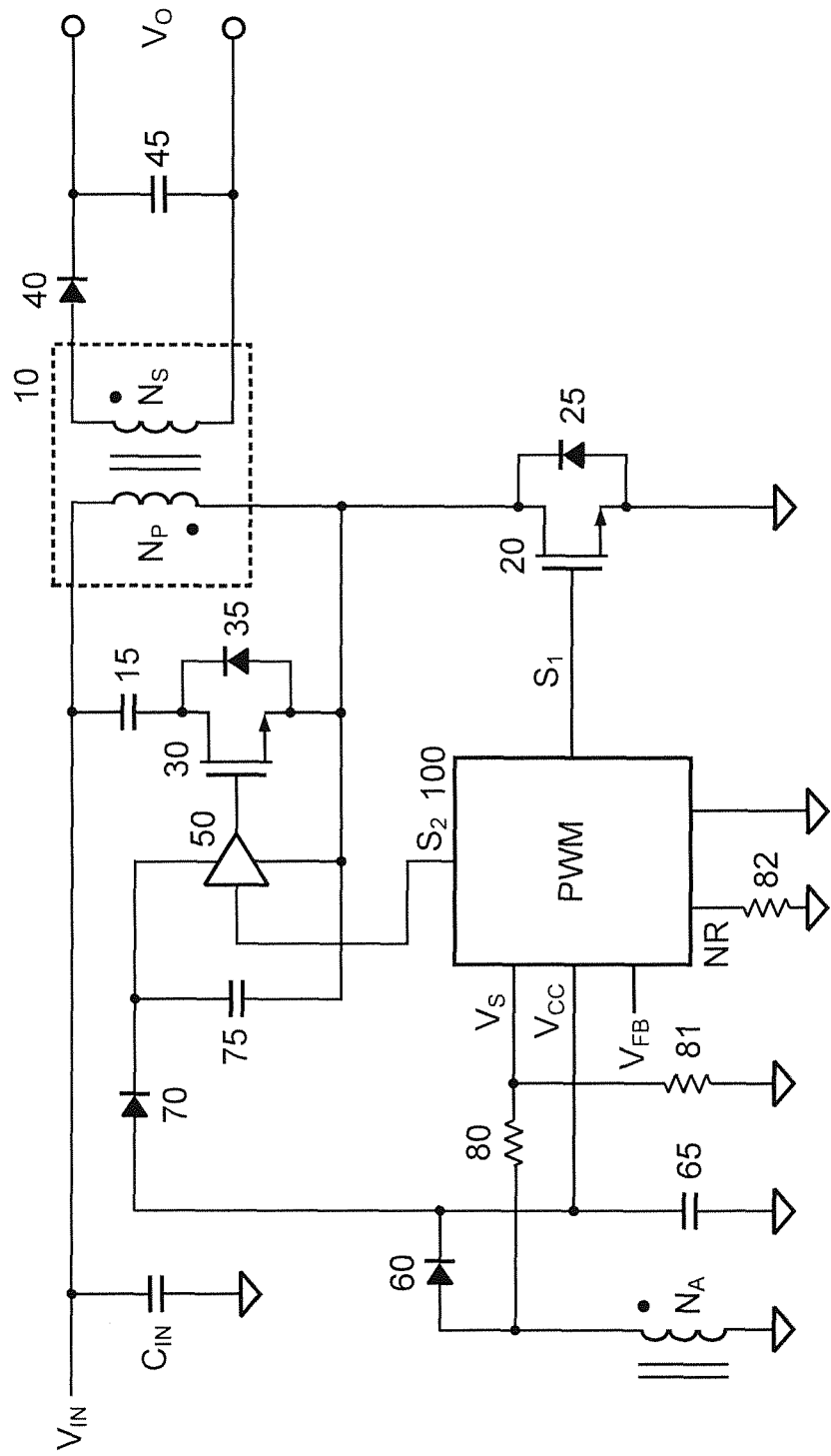
FIG. 1 is a circuit diagram of an embodiment of the power converter in accordance with the present invention.

FIG. 1 is a circuit diagram of an embodiment of the power converter in accordance with the present invention. It is a flyback power converter with active clamp. The power converter includes a transformer 10 connected to an input voltage $V_{IN}$ of the power converter. The transformer 10 has a primary winding $N_P$ and a secondary winding $N_S$. A first terminal of the primary winding $N_P$ is coupled to one terminal of an input capacitor $C_{IN}$ and receives the input voltage $V_{IN}$. The other terminal of the input capacitor $C_{IN}$ is coupled to a ground. The control circuit for the flyback power converter includes transistors 20, 30, a capacitor 15, a high-side drive circuit 50, and a controller (PWM) 100.

The transistor 20 is coupled between a second terminal of the primary winding $N_P$ and the ground. The transistor 20 is a low-side transistor coupled to switch the primary winding $N_P$ of the transformer 10. A parasitic diode 25 is a body diode that is coupled to the transistor 20 in parallel. An output voltage $V_O$ is generated through a rectifier 40 and an output capacitor 45. The controller 100 generates a switching signal $S_1$ coupled to drive the transistor 20 for regulating the output voltage $V_O$ of the power converter. The switching signal $S_1$ is generated in accordance with a feedback signal $V_{FB}$. The feedback signal $V_{FB}$ is correlated to the output voltage $V_O$ of the power converter.

The transformer 10 further includes an auxiliary winding $N_A$ for generating a power source $V_{CC}$ via a rectifier 60 and a capacitor 65. The power source $V_{CC}$ is connected to supply the power to the controller 100. A first terminal of the rectifier 60 is coupled to a first terminal of the auxiliary winding $N_A$. A second terminal of the auxiliary winding $N_A$ is coupled to the ground. One terminal of the capacitor 65 is coupled to a second terminal of the rectifier 60 and the controller 100. The other terminal of the capacitor 65 is coupled to the ground.

A voltage divider including resistors 80 and 81 is coupled between the auxiliary winding $N_A$ and the ground for generating a reflected signal $V_S$ connected to the controller 100. The reflected signal $V_S$ represents a reflected voltage of the transformer 10. The reflected signal $V_S$ has the information of the output voltage $V_O$ during the demagnetizing period of the transformer 10. The transistor 30 is connected in series with a capacitor 15 to develop an active-clamper. The capacitor 15 is coupled to the first terminal of the primary winding $N_P$, and the transistor 30 is coupled to the second terminal of the primary winding $N_P$. Therefore, the active-clamper is connected in parallel with the primary winding $N_P$ of the transformer 10. The transistor 30 is a high-side transistor. When the transistor 20 is turned off, the energy of the leakage inductance of the transformer 10 will be stored into the capacitor 15 through the transistor 30 and its body diode 35.

The high-side drive circuit 50 is coupled to drive the transistor 30. A charge-pump circuit is coupled to the power source $V_{CC}$ and the high-side drive circuit 50 for providing a voltage source in accordance with the power source $V_{CC}$ to the high-side drive circuit 50. The charge-pump circuit is developed by a diode 70 coupled to the power source $V_{CC}$, and a capacitor 75 connected to the diode 70 in series. The capacitor 75 is further coupled to the high-side drive circuit 50.

The controller 100 generates an active-clamp signal $S_2$ in accordance with the reflected signal $V_S$ for controlling the high-side drive circuit 50 and the transistor 30. The active-clamp signal $S_2$ is generated in response to a predicted time $T_{DS}$ that is related to the demagnetizing time of the transformer 10. The active-clamp signal $S_2$ can only be enabled once the switching signal $S_1$ is disabled. The input voltage $V_{IN}$, the output voltage $V_O$, the on-time $T_{ON}$ of the switching signal $S_1$, and the turn-ratio of the transformer 10 are utilized to determine the predicted time $T_{DS}$. The reflected signal $V_S$ is utilized to predict the discharge time of the transformer 10. A resistor 82 is coupled to a terminal NR of the controller 100 for programming the turn-ratio of the transformer 10, and therefore the resistance of the resistor 82 is correlated to the turn-ratio of the transformer 10. When the transistor 30 is turned on by the active-clamp signal $S_2$, the energy of the leakage inductance of the transformer 10 stored in the capacitor 15 will be delivered to the transformer 10, which recycles the energy of the leakage inductance of the transformer 10.

Figure 2:
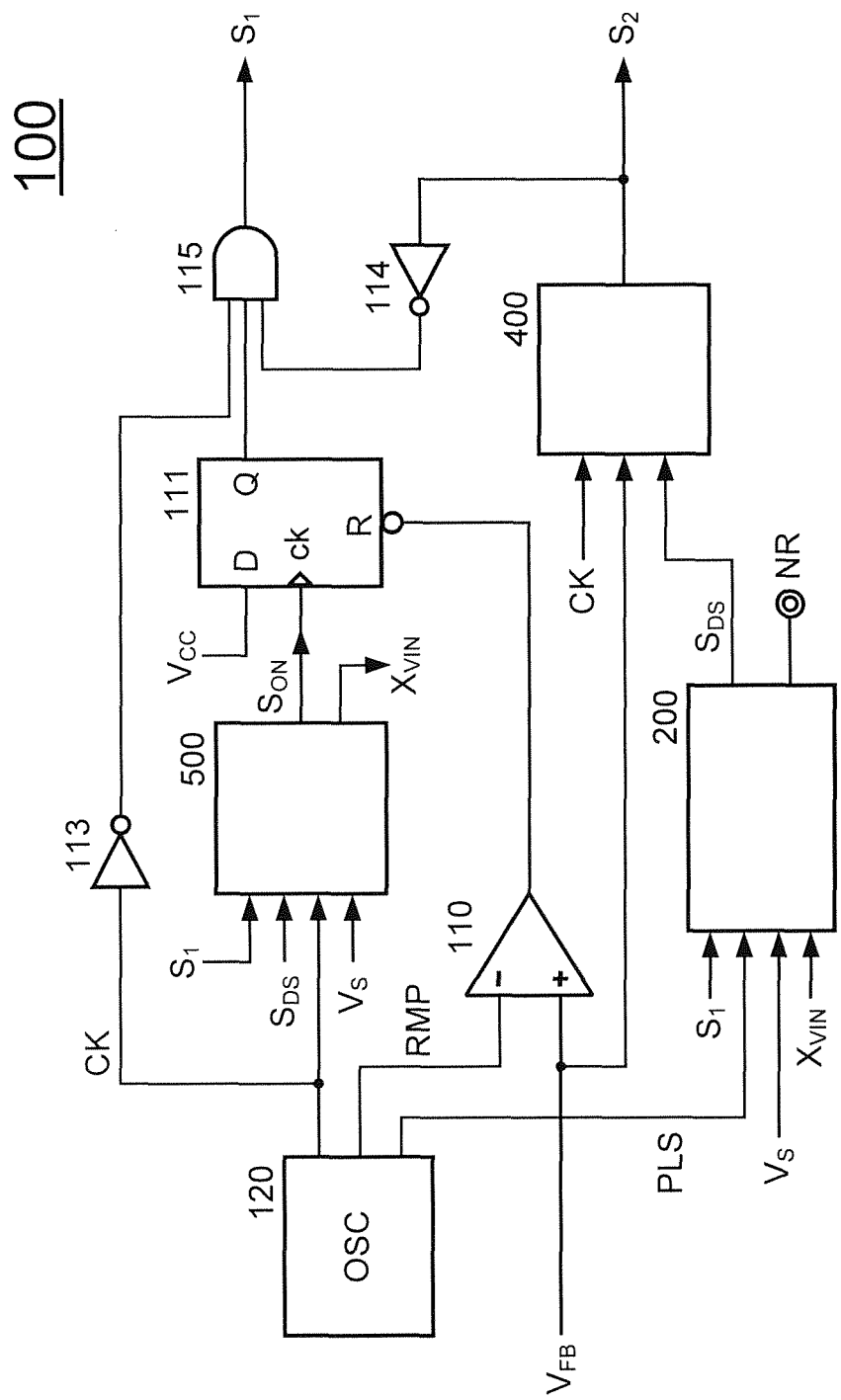
FIG. 2 is a circuit diagram of an embodiment of the controller in accordance with the present invention.

FIG. 2 is a circuit diagram of an embodiment of the controller 100 in accordance with the present invention. It includes an oscillation circuit (OSC) 120 generating a clock signal CK, a ramp signal RMP, and a pulse signal PLS. The clock signal CK and/or the reflected signal $V_S$ is coupled to disable the switching signal $S_1$ through a turn-on circuit 500, a flip-flop 111, and an AND gate 115. The switching signal $S_1$, a predict-time signal $S_{DS}$, the clock signal CK, and the reflected signal $V_S$ are coupled to the turn-on circuit 500 for generating a turn-on signal $S_{ON}$ coupled to a clock input terminal ck of the flip-flop 111. The power source $V_{CC}$ is supplied to an input terminal D of the flip-flop 111. The clock signal CK is coupled to a first input terminal of the AND gate 115 via an inverter 113. The active-clamp signal $S_2$ is also coupled to a second input terminal of the AND gate 115 through an inverter 114. Therefore, the switching signal $S_1$ can be enabled once the active-clamp signal $S_2$ is disabled. Furthermore, an output terminal Q of the flip-flop 111 is coupled to a third input terminal of the AND gate 115 for generating the switching signal $S_1$. Therefore, the turn-on signal $S_{ON}$ is utilized to control the switching signal $S_1$. The turn-on circuit 500 further generates an input-voltage signal $X_{VIN}$. The level of the input-voltage signal $X_{VIN}$ is related to the level of the input voltage $V_{IN}$ (as shown in FIG. 1).

The ramp signal RMP is compared with the feedback signal $V_{FB}$ in a comparator 110. Once the ramp signal RMP is higher than the feedback signal $V_{FB}$, the comparator 110 generates a signal coupled to a reset input terminal R of the flip-flop 111 to disable the switching signal $S_1$ for the pulse width modulation (PWM). The terminal NR (the resistor 82 shown in FIG. 1), the pulse signal PLS, the reflected signal $V_S$, and the switching signal $S_1$ are coupled to a predict-time signal generation circuit 200 for generating the predict-time signal $S_{DS}$. The predict-time signal $S_{DS}$ represents the predicted time $T_{DS}$ of the transformer 10. The input-voltage signal $X_{VIN}$ is further coupled to the predict-time signal generation circuit 200. The predict-time signal $S_{DS}$, the clock signal CK, and the feedback signal $V_{FB}$ are coupled to an active-clamp signal generation circuit 400 for generating the active-clamp signal $S_2$. According to the above, the controller 100 generates the switching signal $S_1$ and the active-clamp signal $S_2$ in response to the predict-time signal $S_{DS}$. Therefore, the switching signal $S_1$ and the active-clamp signal $S_2$ are generated in accordance with the input voltage $V_{IN}$, the output voltage $V_O$ (as shown in FIG. 1), and the on-time $T_{ON}$ of the switching signal $S_1$.

Figure 3:
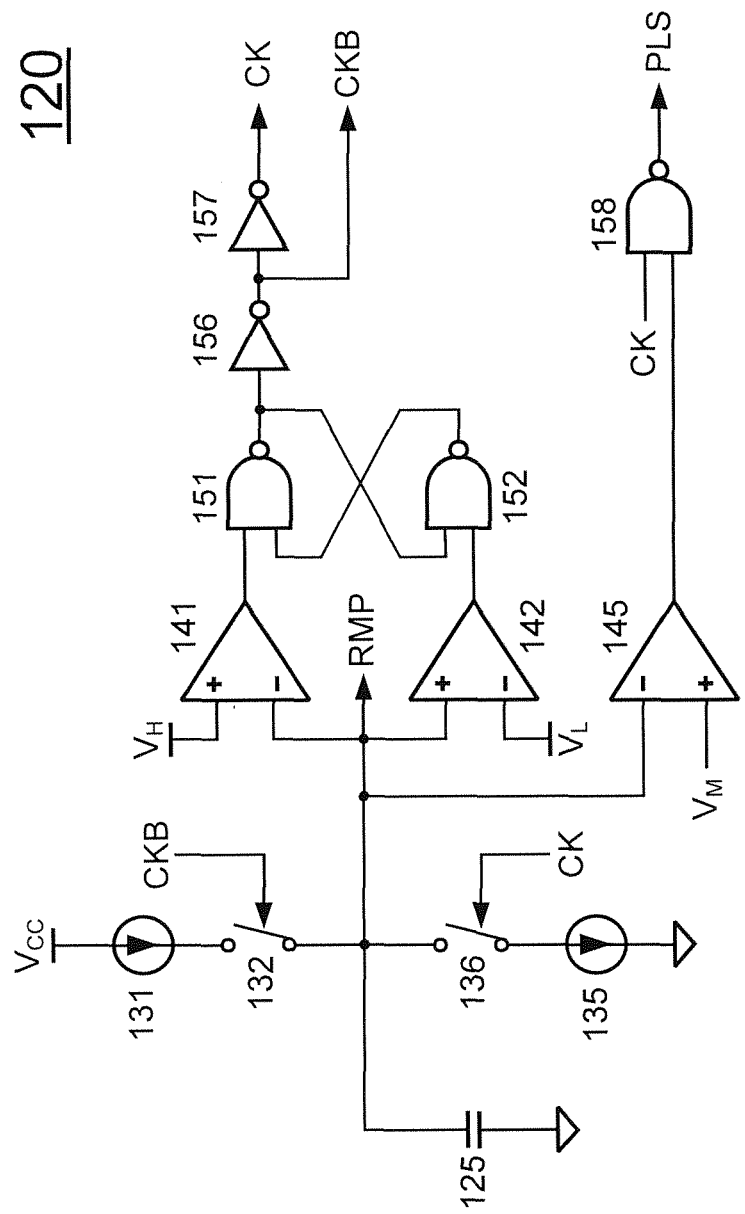
FIG. 3 is a circuit diagram of an embodiment of the oscillation circuit in accordance with the present invention.

FIG. 3 is a circuit diagram of an embodiment of the oscillation circuit 120 in accordance with the present invention. The oscillation circuit 120 includes current sources 131, 135, switches 132, 136, and a capacitor 125 for generating the ramp signal RMP. The current source 131 is coupled between the power source $V_{CC}$ and a first terminal of the switch 132. The capacitor 125 is coupled between a second terminal of the switch 132 and the ground. The current source 135 is coupled between the ground and a second terminal of the switch 136. A first terminal of the switch 136 is coupled to the capacitor 125. The current sources 131 and 135 are utilized to charge and discharge the capacitor 125 through the switches 132 and 136 respectively. The ramp signal RMP is generated in the capacitor 125.

The ramp signal RMP is further coupled to comparators 141, 142, and 145. The ramp signal RMP is coupled to negative input terminals of the comparators 141 and 145. The ramp signal RMP is further coupled to a positive input terminal of the comparator 142. The comparator 141 has a trip-point voltage $V_H$ supplied to a positive input terminal of the comparator 141 to compare with the ramp signal RMP. The comparator 142 has a trip-point voltage $V_L$ supplied to a negative input terminal of the comparator 142 to compare with the ramp signal RMP. The comparator 145 has a threshold voltage $V_M$ supplied to a positive input terminal of the comparator 145 to compare with the ramp signal RMP, in which the voltage level of the voltage is $V_H > V_M > V_L$.

NAND gates 151 and 152 form a latch circuit connected to receive the output signals of the comparators 141 and 142. The latch circuit and inverters 156, 157 are utilized to generate clock signals CK and CKB. The clock signal CK is applied to control the switch 136 for the discharge of the capacitor 125. The clock signal CKB is used for controlling the switch 132 for the charge of the capacitor 125. A first input terminal of the NAND gate 151 is coupled to an output terminal of the comparator 141. A first input terminal of the NAND gate 152 is coupled to an output terminal of the comparator 142. A second input terminal of the NAND gate 151 is coupled to an output terminal of the NAND gate 152. An output terminal of the NAND gate 151 is coupled to a second input terminal of the NAND gate 152. An output signal of the NAND gate 151 is connected to an input terminal of the inverter 156 for generating the clock signal CKB at an output terminal of the inverter 156. The clock signal CKB is further coupled to an input terminal of the inverter 157 for generating the clock signal CK at an output terminal of the inverter 157. An output signal of the comparator 145 and the clock signal CK are utilized to generate the pulse signal PLS through an NAND gate 158. Therefore, the pulse signal PLS is correlated to the clock signal CK.

Figure 4:
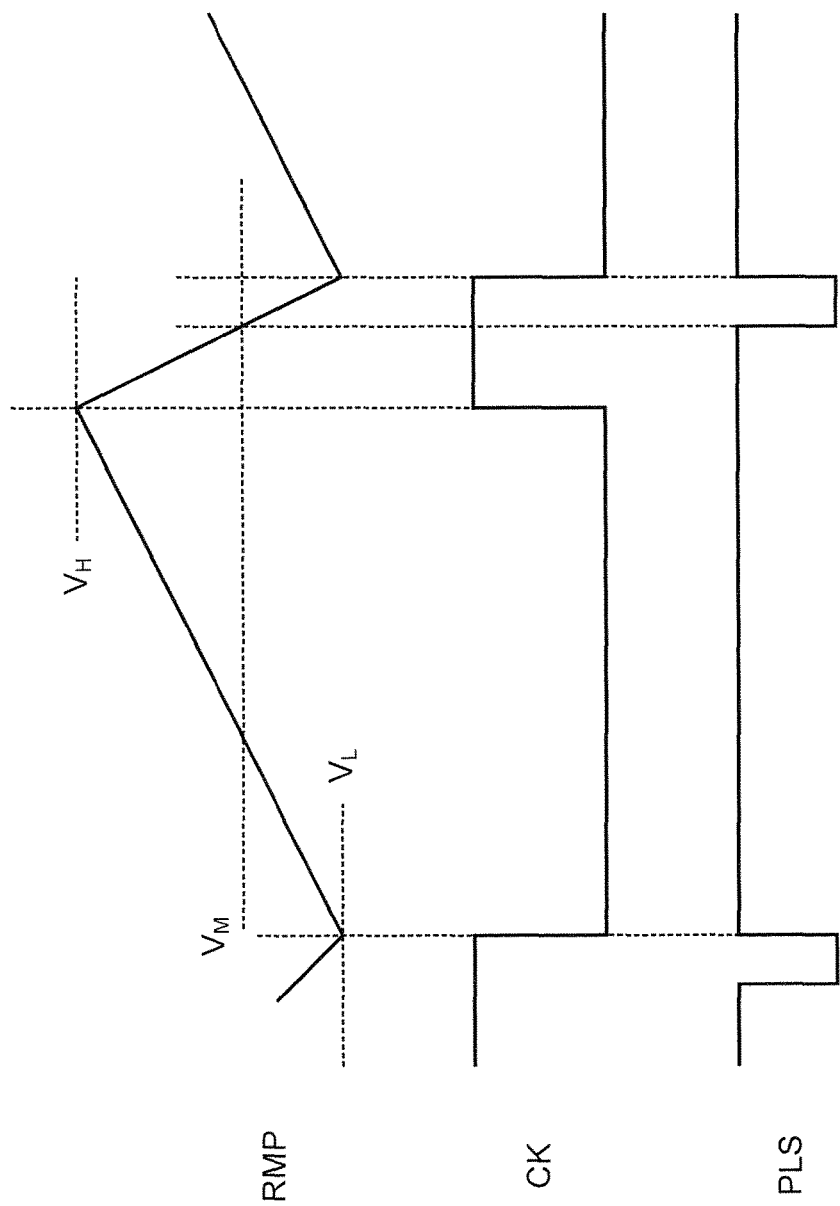
FIG. 4 shows the waveforms of the ramp signal RMP, the clock signal CK, and the pulse signal PLS of the oscillation circuit in accordance with the present invention.

FIG. 4 shows the waveforms of the ramp signal RMP, the clock signal CK, and the pulse signal PLS of the oscillation circuit 120 in accordance with the present invention. The clock signal CK is enabled (logic high) when the ramp signal RMP is higher than the trip-point voltage $V_H$. Once the ramp signal RMP is lower than the trip-point voltage $V_L$, the clock signal CK is disabled (logic low). The pulse signal PLS is generated (enabled, logic high) when the clock signal CK is disabled. Therefore, the pulse signal PLS is generated before the enable of the clock signal CK. Once the clock signal CK is enabled and the ramp signal RMP is lower than the threshold voltage $V_M$, the pulse signal PLS is disabled.

Figure 5:
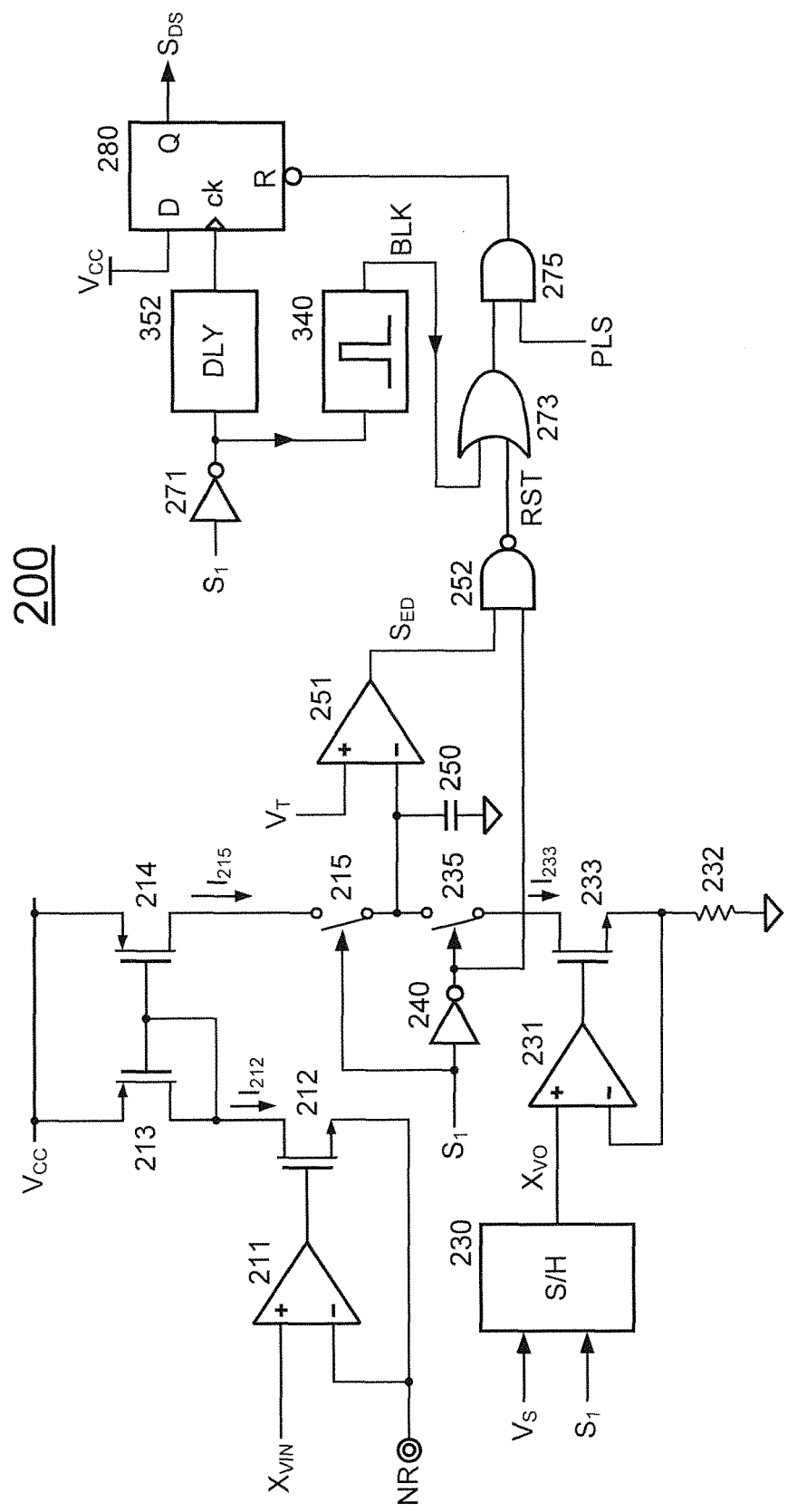
FIG. 5 is a circuit diagram of an embodiment of the predict-time signal generation circuit in accordance with the present invention.

FIG. 5 is a circuit diagram of an embodiment of the predict-time signal generation circuit 200 in accordance with the present invention. A switch 215 is coupled between a current $I_{215}$ and a first terminal of a capacitor 250. The switch 215 is controlled by the switching signal $S_1$. A second terminal of the capacitor 250 is coupled to the ground. A switch 235 is coupled between a current $I_{233}$ and the first terminal of the capacitor 250. The switching signal $S_1$ controls the switch 235 via an inverter 240. The capacitor 250 will be charged by the current $I_{215}$ via the switch 215 during the on-time ($T_{ON}$) of the switching signal $S_1$. The capacitor 250 will be discharged by the current $I_{233}$ via the switch 235 when the switching signal $S_1$ is disabled.

A negative input terminal of a comparator 251 is coupled to the capacitor 250 to receive the voltage of the capacitor 250. A threshold $V_T$ is supplied to a positive input terminal of the comparator 251. The comparator 251 will generate an end-of-discharge signal $S_{ED}$ when the voltage of the capacitor 250 is lower than the threshold $V_T$. The end-of-discharge signal $S_{ED}$ is coupled to a first input terminal of an NAND gate 252. The switching signal $S_1$ is coupled to a second input terminal of the NAND gate 252 through the inverter 240. Through the NAND gate 252, the end-of-discharge signal $S_{ED}$ will be utilized to generate a reset signal RST (logic low) when the switching signal $S_1$ is disabled.

Sources of the transistors 213 and 214 are coupled to the power source $V_{CC}$. Gates of the transistors 213, 214 and a drain of the transistor 213 are coupled together to receive a current $I_{212}$. Current mirror transistors 213 and 214 are utilized to generate the current $I_{215}$ at a drain of the transistor 214 in accordance with the current $I_{212}$. A positive input terminal of an operational amplifier 211 is coupled to receive the input-voltage signal $X_{VIN}$. A negative input terminal of the operational amplifier 211 is coupled to the resistor 82 (as shown in FIG. 1) via the terminal NR. An output terminal of the operational amplifier 211 is coupled to a gate of a transistor 212. A source of the transistor 212 is coupled to the negative input terminal of the operational amplifier 211 and the resistor 82 via the terminal NR. A drain of the transistor 212 is coupled to the drain of the transistor 213. The operational amplifier 211, the resistor 82 (via the terminal NR), and the transistor 212 develop a voltage to current circuit to generate the current $I_{212}$ in accordance with the input-voltage signal $X_{VIN}$ and the resistance of the resistor 82.

A positive input terminal of an operational amplifier 231 is coupled to receive an output-voltage signal $X_{VO}$. A negative input terminal of the operational amplifier 231 is coupled to a resistor 232. An output terminal of the operational amplifier 231 is coupled to a gate of a transistor 233. A source of the transistor 233 is coupled to the negative input terminal of the operational amplifier 231 and the resistor 232. A drain of the transistor 233 is coupled to the capacitor 250 via the switch 235. The operational amplifier 231, the resistor 232, and the transistor 233 develop a voltage to current circuit to generate the current $I_{233}$ at the drain of the transistor 233 in accordance with the output-voltage signal $X_{VO}$. The output-voltage signal $X_{VO}$ is related to the voltage level of the output voltage $V_O$ (as shown in FIG. 1). The output-voltage signal $X_{VO}$ is generated through a sample-and-hold circuit (S/H) 230 by sampling the reflected signal $V_S$ during the off time period of the switching signal $S_1$. The voltage level across the capacitor 250 is correlated to the period of the demagnetizing time of the transformer 10 (as shown in FIG. 1).

The detail skill of sampling the reflected signal for generating the related output voltage signal can be found in the prior arts of "Close-loop PWM controller for primary-side controlled power converters", U.S. Pat. No. 7,016,204; "Multiple-sampling circuit for measuring reflected voltage and discharge time of a transformer", U.S. Pat. No. 7,151,681; "Causal sampling circuit for measuring reflected voltage and demagnetizing time of transformer", U.S. Pat. No. 7,349,229; "Linear-predict sampling for measuring demagnetized voltage of transform", U.S. Pat. No. 7,486,528.

The switching signal $S_1$ is coupled to an input terminal of an inverter 271. An output terminal of the inverter 271 is coupled to an input terminal of a delay circuit (DLY) 352. An output terminal of the delay circuit 352 is coupled to a clock input terminal ck of a flip-flop 280. The power source $V_{CC}$ is supplied to an input terminal D of the flip-flop 280. An output terminal Q of the flip-flop 280 outputs the predict-time signal $S_{DS}$. The switching signal $S_1$ is coupled to generate the predict-time signal $S_{DS}$ via the inverter 271, the delay circuit 352, and the flip-flop 280. Therefore, when the switching signal $S_1$ is disabled, the predict-time signal $S_{DS}$ will be enabled after a time delay $T_B$ shown in FIG. 7B.

The reset signal RST is coupled to a first input terminal of an OR gate 273. An output terminal of the OR gate 273 is coupled to a first input terminal of an AND gate 275. The pulse signal PLS is coupled to a second input terminal of the AND gate 275. An output terminal of the AND gate 275 is coupled to a reset input terminal R of the flip-flop 280 to reset the flip-flop 280. Therefore, the reset signal RST and the pulse signal PLS are coupled to disable the flip-flop 280 via the AND gate 275 and the OR gate 273 for disabling the predict-time signal $S_{DS}$.

The pulse signal PLS is utilized to disable the predict-time signal $S_{DS}$ when the power converter is operated in CCM (continuous current mode). The CCM operation means that the transformer 10 is not fully demagnetized before the start of the next switching cycle. The switching signal $S_1$ is coupled to a pulse generator 340 via the inverter 271. Through the inverter 271 and the pulse generator 340, a blank signal BLK will be generated in response to the disable of the switching signal $S_1$ to inhibit the reset signal RST resetting the flip-flop 280. The blank signal BLK is coupled to a second input terminal of the OR gate 273. The pulse width of the blank signal BLK is utilized to produce a minimum on-time of the predict-time signal $S_{DS}$. The flip-flop 280 generates the predict-time signal $S_{DS}$. The predict-time signal $S_{DS}$ represents the predicted time $T_{DS}$ of the transformer 10 that is related to the demagnetizing time of the transformer 10 when the power converter is operated in DCM (discontinuous current mode). For the DCM operation, the magnetizing flux is equal to the demagnetizing flux.

$$\Phi\_MAG = \Phi\_DEMAG \quad (1)$$

$$k \times V_{IN} \times T_{ON} = V_O \times T_{DS} \quad (2)$$

$$T_{DS} = \frac{k \times V_{IN}}{V_O} \times T_{ON} \quad (3)$$

Where the $T_{ON}$ is on time of the switching signal $S_1$; $T_{DS}$ is period of the predict-time signal $S_{DS}$. K is a constant that is related to the turn ratio of the transformer 10.

The equation (3) shows the theory for predicting the demagnetizing time of the transformer 10.

$$I_{215} = \frac{K_1 \times V_{IN} \times R_{625}}{(R_{80} // R_{81}) \times R_{82}} \quad (4)$$

$$I_{233} = \frac{K_2 \times V_O \times R_{81}}{(R_{80} + R_{81}) \times R_{232}} \quad (5)$$

$$V_{C250} = \frac{I_{215} \times T_{ON}}{C_{250}} = \frac{I_{233} \times T_{DS}}{C_{250}} \quad (6)$$

$$T_{DS} = \frac{I_{215} \times T_{ON}}{I_{233}} \quad (7)$$

$$T_{DS} = \frac{K_1 \times V_{IN}}{K_2 \times V_O} \times \frac{R_{625} \times R_{232} \times (R_{80} + R_{81})}{R_{82} \times R_{81} \times (R_{80} // R_{81})} \times T_{ON} \quad (8)$$

Where the $R_{80}//R_{81}$ is the resistance of the resistor 80 paralleled with the resistor 81. $K_1$ and $K_2$ are constant. The $R_{625}$ is the resistance of a resistor 625 shown in FIG. 11.

The equation (8) shows the predicted time $T_{DS}$ predicted by the predict-time signal generation circuit 200. It is equivalent to the equation (3). The constant $K_1$ and $K_2$ are related to the turn ratio of the transformer 10. The resistor 82 is used for determining the predicted time $T_{DS}$ for the various transformer designs.

Figure 6A:
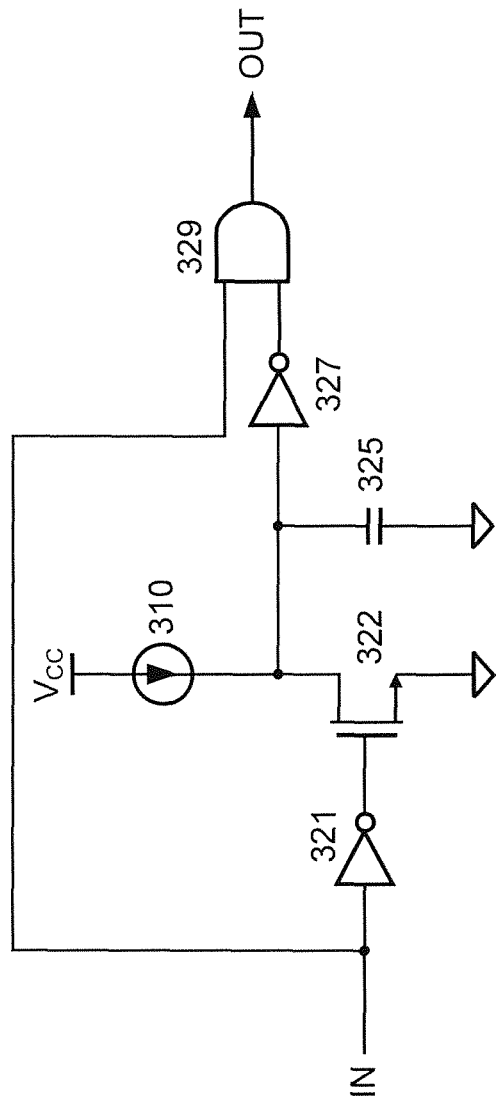
FIG. 6A shows a reference schematic of the pulse generator in accordance with the present invention.

FIG. 6A and FIG. 6B show a reference schematic and the waveforms of an input signal IN and an output signal OUT of the pulse generator 340 in accordance with the present invention. The pulse generator comprises a current source 310, a transistor 322, a capacitor 325, inverters 321, 327, and an AND gate 329. The current source 310 is coupled from the power source $V_{CC}$ to a first terminal of the capacitor 325. A second terminal of the capacitor 325 is coupled to the ground. The current source 310 is used to charge the capacitor 325. A drain of the transistor 322 is coupled to the first terminal of the capacitor 325. A source of the transistor 322 is coupled to the ground. The input signal IN, such as the output signal of the inverter 271 shown in FIG. 5, is coupled to a gate of the transistor 322 through the inverter 321 to control the transistor 322. The input signal IN is further coupled to a first input terminal of the AND gate 329. A second input terminal of the AND gate 329 is coupled to the capacitor 325 through the inverter 327. An output terminal of the AND gate 329 generates the output signal OUT, such as the blank signal BLK shown in FIG. 5. The output signal OUT is a pulse signal.

Once the input signal IN is enabled, the transistor 322 is turned off and the current source 310 charges the capacitor 325 for generating the output signal OUT. The pulse width $T_P$ of the output signal OUT shown in FIG. 6B is determined by the current of the current source 310 and the capacitance of the capacitor 325. The transistor 322 is coupled to discharge the capacitor 325 when the input signal IN is disabled and the transistor 322 is turned on.

Figure 7A:
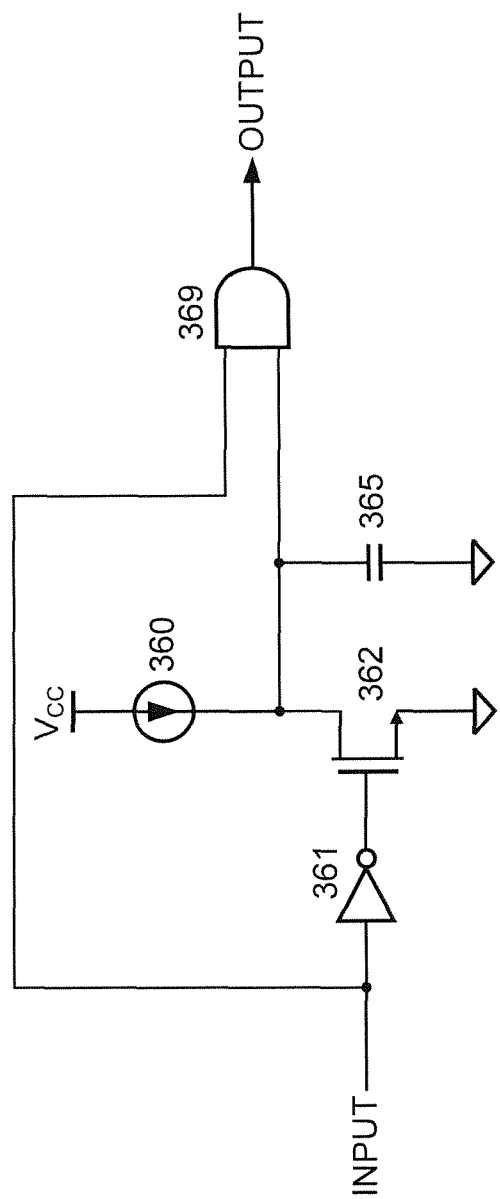
FIG. 7A shows a reference schematic of the delay circuit in accordance with the present invention.

FIG. 7A and FIG. 7B show a reference schematic and the waveforms of an input signal INPUT and an output signal OUTPUT of the delay circuit 352 in accordance with the present invention. The delay circuit 352 comprises a current source 360, a transistor 362, a capacitor 365, an inverter 361, and an AND gate 369. The current source 360 is coupled from the power source $V_{CC}$ to a first terminal of the capacitor 365. A second terminal of the capacitor 365 is coupled to the ground. The current source 360 is used to charge the capacitor 365. A drain of the transistor 362 is coupled to the first terminal of the capacitor 365. A source of the transistor 362 is coupled to the ground. The input signal INPUT, which is the inverse switching signal $S_1$ shown in FIG. 5, is coupled to a gate of the transistor 362 through the inverter 361 to control the transistor 362. The input signal INPUT is further coupled to a first input terminal of the AND gate 369. A second input terminal of the AND gate 369 is coupled to the capacitor 365. An output terminal of the AND gate 369 generates the output signal OUTPUT.

Once the input signal INPUT is enabled, the transistor 362 is turned off and the current source 360 charges the capacitor 365 for generating the output signal OUTPUT after the time delay $T_B$ (as shown in FIG. 7B). The time delay $T_B$ is determined by the current of the current source 360 and the capacitance of the capacitor 365. The transistor 362 is coupled to discharge the capacitor 365 when the input signal INPUT is disabled and the transistor 362 is turned on.

Figure 8:
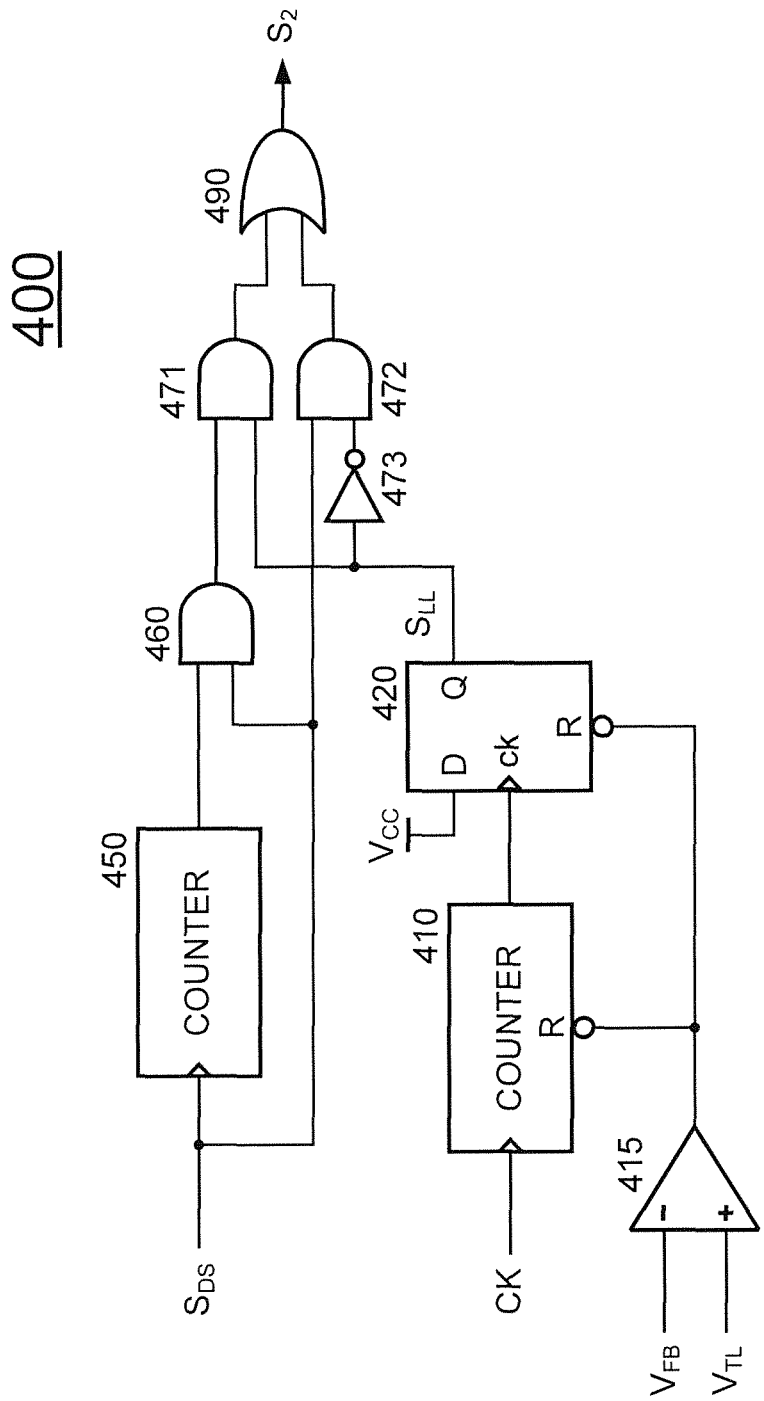
FIG. 8 is a circuit diagram of an embodiment of the active-clamp signal generation circuit in accordance with the present invention.
Figure 12A:
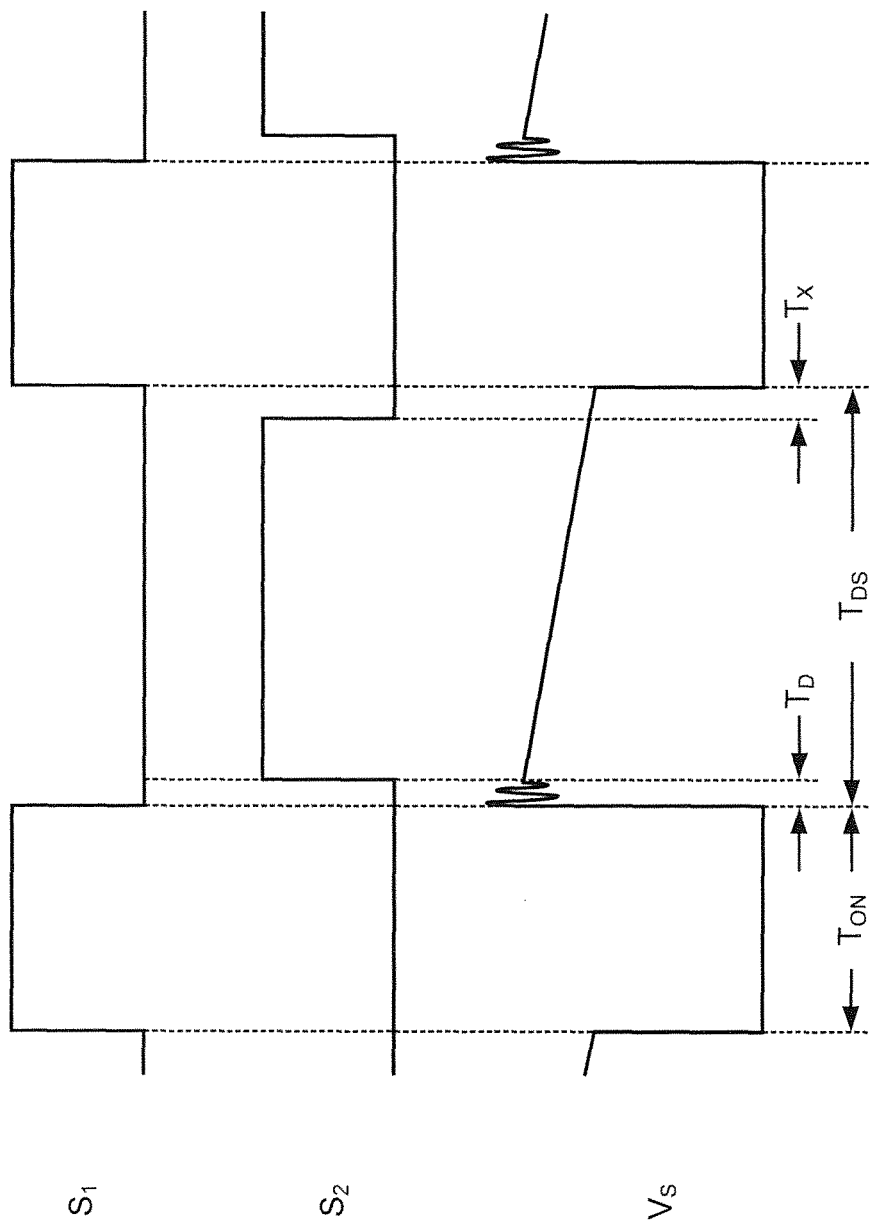
FIG. 12A shows the waveforms of the switching signal $S_1$, the active-clamp signal $S_2$, and the reflected signal $V_S$ operated in CCM according to the present invention.

FIG. 8 is a circuit diagram of an embodiment of the active-clamp signal generation circuit 400 in accordance with the present invention. The active-clamp signal $S_2$ is generated in accordance with the predict-time signal $S_{DS}$. As shown in FIG. 5, Once the switching signal $S_1$ is disabled (logic low), the predict-time signal $S_{DS}$ is enabled (logic high) after the time delay $T_B$ shown in FIG. 7B. Therefore, when the switching signal $S_1$ is disabled, the active-clamp signal $S_2$ is enabled (logic high) after a time delay $T_D$ (as shown in FIG. 12A). An OR gate 490, AND gates 471, 472, and an inverter 473 develop a multiplexer to generate the active-clamp signal $S_2$. Output terminals of the AND gates 471 and 472 are coupled to input terminals of the OR gate 490 to generate the active-clamp signal $S_2$. The predict-time signal $S_{DS}$ is coupled to a first input terminal of the multiplexer (a first input terminal of the AND gate 472). The predict-time signal $S_{DS}$ is coupled to a second input terminal of the multiplexer (a first input terminal of the AND gate 471) through a counter 450 and an AND gate 460. The counter 450 operates as a divider to the predict-time signal $S_{DS}$. The divided predict-time signal $S_{DS}$ is coupled to an input terminal of the AND gate 460.

The feedback signal $V_{FB}$ is coupled to a negative input terminal of a comparator 415. A light-load threshold $V_{TL}$ is supplied to a positive input terminal of the comparator 415. An output terminal of the comparator 415 is coupled to reset input terminals R of a counter 410 and a flip-flop 420. The comparator 415 is utilized to generate a selection signal $S_{LL}$ when the level of the feedback signal $V_{FB}$ is lower than the level of the light-load threshold $V_{TL}$. The clock signal CK is coupled to an input terminal of the counter 410. An output terminal of the counter 410 is coupled to a clock input terminal ck of the flip-flop 420. The power source $V_{CC}$ is supplied to an input terminal D of the flip-flop 420.

Figure 9:
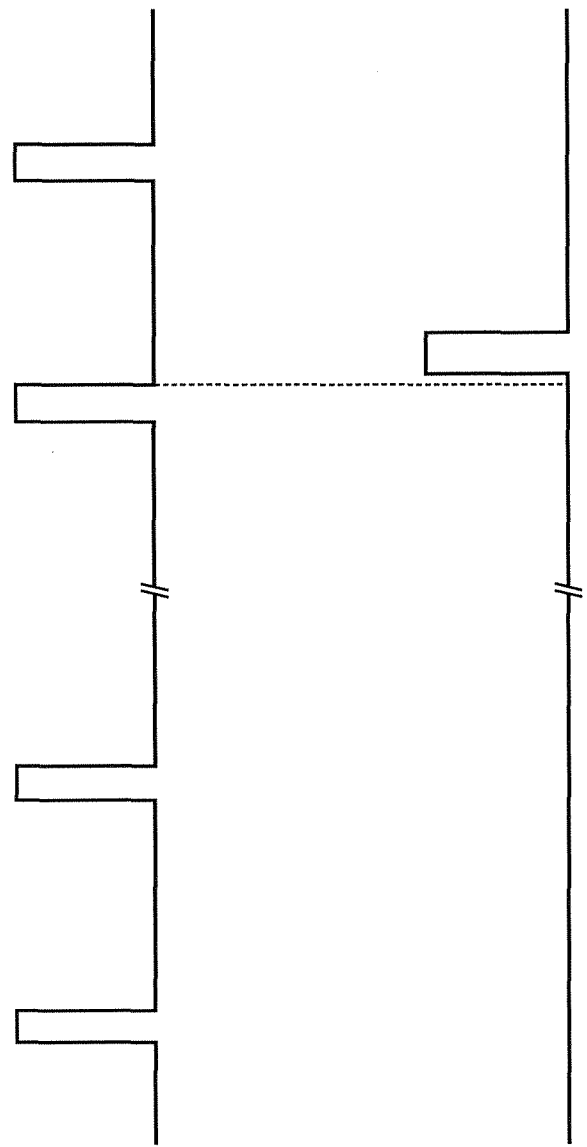
FIG. 9 shows the waveforms of the switching signal $S_1$ and the active-clamp signal $S_2$ in the light load condition according to the present invention.

The counter 410 and the flip-flop 420 provide a time delay for generating the selection signal $S_{LL}$. The selection signal $S_{LL}$ is coupled to the multiplexer (second input terminals of the AND gates 471 and 472) for the signal selection. For a normal condition, the level of the selection signal $S_{LL}$ is the logic low, and therefore the active-clamp signal $S_2$ is generated in accordance with the predict-time signal $S_{DS}$. During a light load condition, the feedback signal $V_{FB}$ is lower than the light-load threshold $V_{TL}$, the level of the selection signal $S_{LL}$ is the logic high, and therefore the active-clamp signal $S_2$ is generated in response to the divided predict-time signal $S_{DS}$. Therefore, the pulse number of the active-clamp signal $S_2$ is less than the pulse number of the predict-time signal $S_{DS}$ in the light load condition. It means that the pulse number of the active-clamp signal $S_2$ is less than the pulse number of the switching signal $S_1$ in the light load condition, as shown in FIG. 9.

Figure 10:
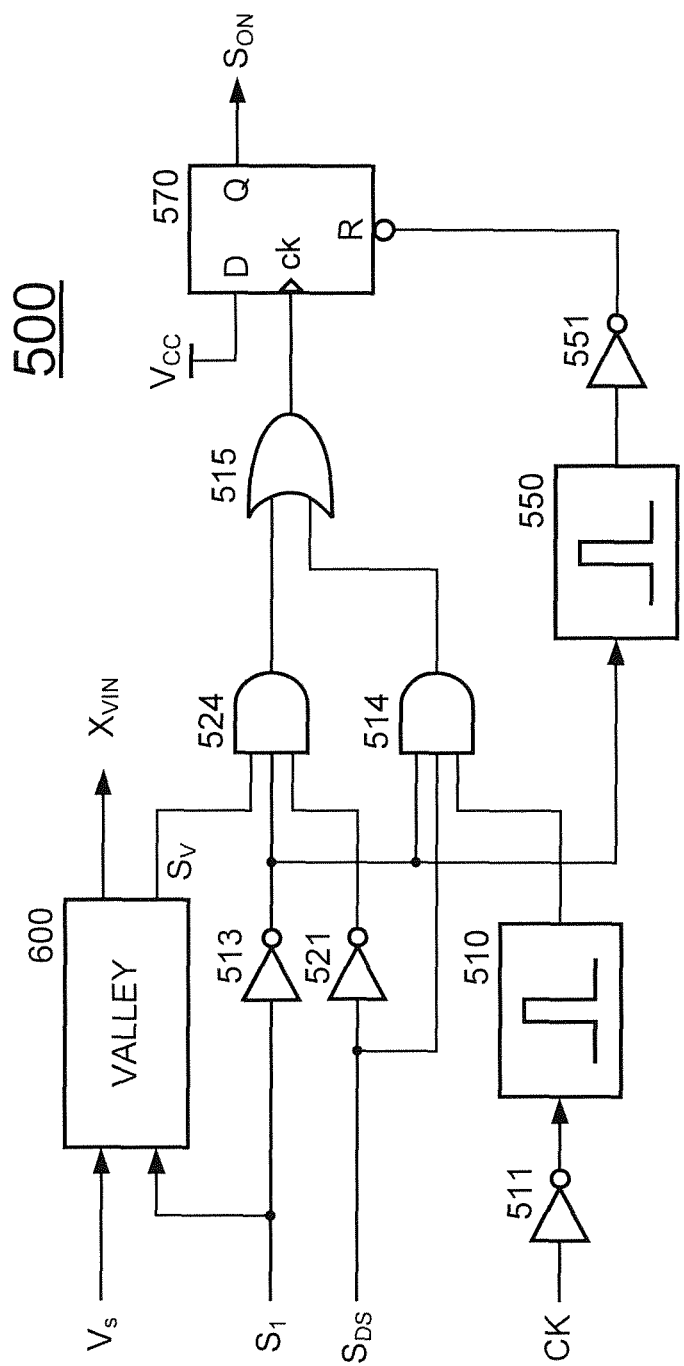
FIG. 10 is a circuit diagram of an embodiment of the turn-on circuit in accordance with the present invention.

FIG. 10 is a circuit diagram of an embodiment of the turn-on circuit 500 in accordance with the present invention. The power source $V_{CC}$ is supplied to an input terminal D of a flip-flop 570. The flip-flop 570 is utilized to generate the turn-on signal $S_{ON}$ at an output terminal Q of the flip-flop 570. The switching signal $S_1$ is coupled to an input terminal of a pulse generator 550 via an inverter 513 to generate a pulse signal. The pulse signal is coupled to a reset input terminal R of the flip-flop 570 via an inverter 551. Thus, the flip-flop 570 is cleared in response to the disable of the switching signal $S_1$ via the inverters 513, 551, and the pulse generator 550. The circuit of the pulse generator 550 is the some as the circuit of the pulse generator shown in FIG. 6A.

The clock signal CK is coupled to an input terminal of a pulse generator 510 via an inverter 511 to generate a pulse signal. The circuit of the pulse generator 510 is the same as the circuit of the pulse generator shown in FIG. 6A. The pulse signal is coupled to a clock input terminal ck of the flip-flop 570 via an AND gate 514 and an OR gate 515. The pulse signal generated by the pulse generator 510 is coupled to a first input terminal of the AND gate 514. An output terminal of the AND gate 514 is coupled to a first input terminal of the OR gate 515. An output terminal of the OR gate 515 is coupled to the clock input terminal ck of the flip-flop 570. The turn-on signal $S_{ON}$ is enabled in response to the clock signal CK in the CCM operation. The clock signal CK enables the turn-on signal $S_{ON}$ via the inverter 511, the pulse generator 510, the AND gate 514, the OR gate 515, and the flip-flop 570. As shown in FIG. 2, the switching signal $S_1$ is enabled in response to the turn-on signal $S_{ON}$, and the turn-on signal $S_{ON}$ is enabled in response to the clock signal CK in the CCM operation. Thus, the switching signal $S_1$ is enabled in response to the clock signal CK in the CCM operation.

The predict-time signal $S_{DS}$ is coupled to a second input terminal of the AND gate 514. The enable of the predict-time signal $S_{DS}$ will enable the AND gate 514 for CCM operation. The switching signal $S_1$ is further coupled to a third input terminal of the AND gate 514 via the inverter 513.

The predict-time signal $S_{DS}$ is coupled to a first input terminal of an AND gate 524 via an inverter 521. The switching signal $S_1$ is further coupled to a second input terminal of the AND gate 524 via the inverter 513. An output terminal of the AND gate 524 is coupled to a second input terminal of the OR gate 515. Once the transformer 10 (as shown in FIG. 1) is demagnetized, the predict-time signal $S_{DS}$ is disabled, and the turn-on signal $S_{ON}$ will be enabled in response to the reflected signal $V_S$. The reflected signal $V_S$ is utilized to generate a valley-voltage signal $S_V$ and the input-voltage signal $X_{VIN}$ through a valley-signal generation circuit (VALLEY) 600. The valley-signal generation circuit 600 is further coupled to receive the switching signal $S_1$. The valley-voltage signal $S_V$ is coupled to a third input terminal of the AND gate 524. The valley-voltage signal $S_V$ enables the turn-on signal $S_{ON}$ via the AND gate 524, the OR gate 515, and the flip-flop 570. The zero voltage switching (ZVS) and/or the soft switching can be achieved in the heavy load condition when the switching signal $S_1$ turns on the transistor 20 (as shown in FIG. 1) in response to the valley-voltage signal $S_V$. The valley-voltage signal $S_V$ represents a valley voltage of the reflected signal $V_S$.

The control circuits of the "valley voltage switching" can be found in the prior arts of "Switching control circuit having a valley voltage detector to achieve soft switching for a resonant power converter", U.S. Pat. No. 7,426,120; "Control circuit having off-time modulation to operate power converter at quasi-resonance and in continuous current mode", U.S. Pat. No. 8,094,468; "Control circuit with burst mode and extended valley switching for quasi-resonant power converter", U.S. patent application 20120069608; "Controller with valley switching and limited maximum frequency for quasi-resonant power converters", U.S. patent application 20120081084.

Figure 11:
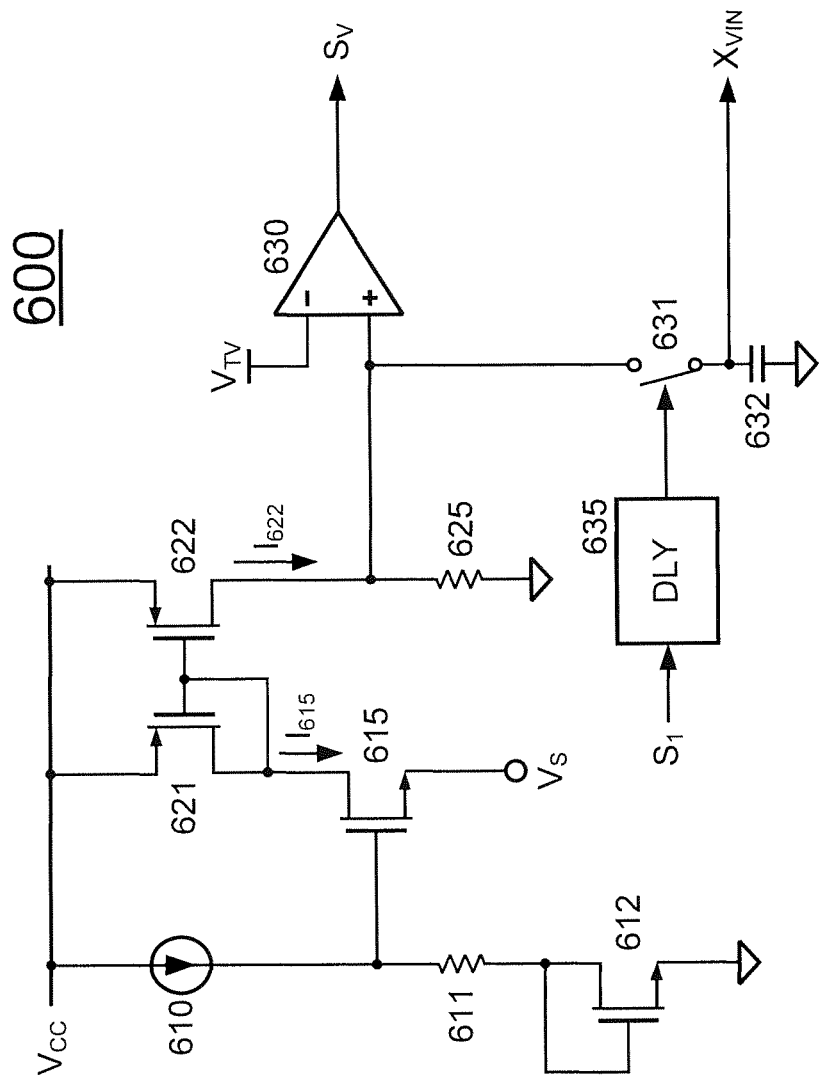
FIG. 11 is a circuit diagram of an embodiment of the valley-signal generation circuit in accordance with the present invention.

FIG. 11 is a circuit diagram of an embodiment of the valley-signal generation circuit 600 in accordance with the present invention. A current source 610 is connected between the power source $V_{CC}$ and a gate of a transistor 615. A resistor 611 is connected between the gate of the transistor 615 and a drain of a transistor 612. A gate and the drain of the transistor 612 are connected together. A source of the transistor 612 is connected to the ground. The current source 610, the resistor 611, and the transistor 612 provide a bias voltage to the transistor 615. A source of the transistor 615 is coupled to receive the reflected signal $V_S$ for generating a current $I_{615}$ coupled to mirror transistors 621 and 622.

Sources of the transistors 621 and 622 are coupled to the power source $V_{CC}$. Gates of the transistors 621, 622 and drains of the transistors 615, 621 are coupled together. In response to the current $I_{615}$, a drain of the transistor 622 generates a current $I_{622}$ coupled to generate a voltage at a resistor 625. The resistor 625 is coupled from the drain of the transistor 622 to the ground. A positive input terminal of a comparator 630 receives the voltage of the resistor 625. A threshold $V_{TV}$ is supplied to a negative input terminal of the comparator 630. The valley-voltage signal $S_V$ is generated by the comparator 630 when the voltage of the resistor 625 is higher than the threshold $V_{TV}$. A switch 631 is further coupled between the resistor 625 and a capacitor 632 to sample and store the voltage of the resistor 625 into the capacitor 632 for generating the input-voltage signal $X_{VIN}$. The switching signal $S_1$ is coupled to control the switch 631 through a delay circuit (DLY) 635. The approach of detecting the input voltage of the transformer can be found in the prior arts of "Control method and circuit with indirect input voltage detection by switching current slope detection", U.S. Pat. No. 7,616,461; "Detection circuit for sensing the input voltage of transformer", U.S. Pat. No. 7,671,578.

FIG. 12A shows the waveforms of the switching signal $S_1$, the active-clamp signal $S_2$, and the reflected signal $V_S$ operated in CCM according to the present invention. When the switching signal $S_1$ is disabled, the active-clamp signal $S_2$ will be enabled after the time delay $T_D$. The period of the time delay $T_D$ is determined by the delay circuit 352 shown in FIG. 5. The pulse width of the active-clamp signal $S_2$ is related to the period of the predicted time $T_{DS}$. The active-clamp signal $S_2$ will be disabled before the switching signal $S_1$ is enabled. A dead time $T_X$ is determined by the pulse width of the pulse signal PLS shown in FIG. 2.

Figure 12B:
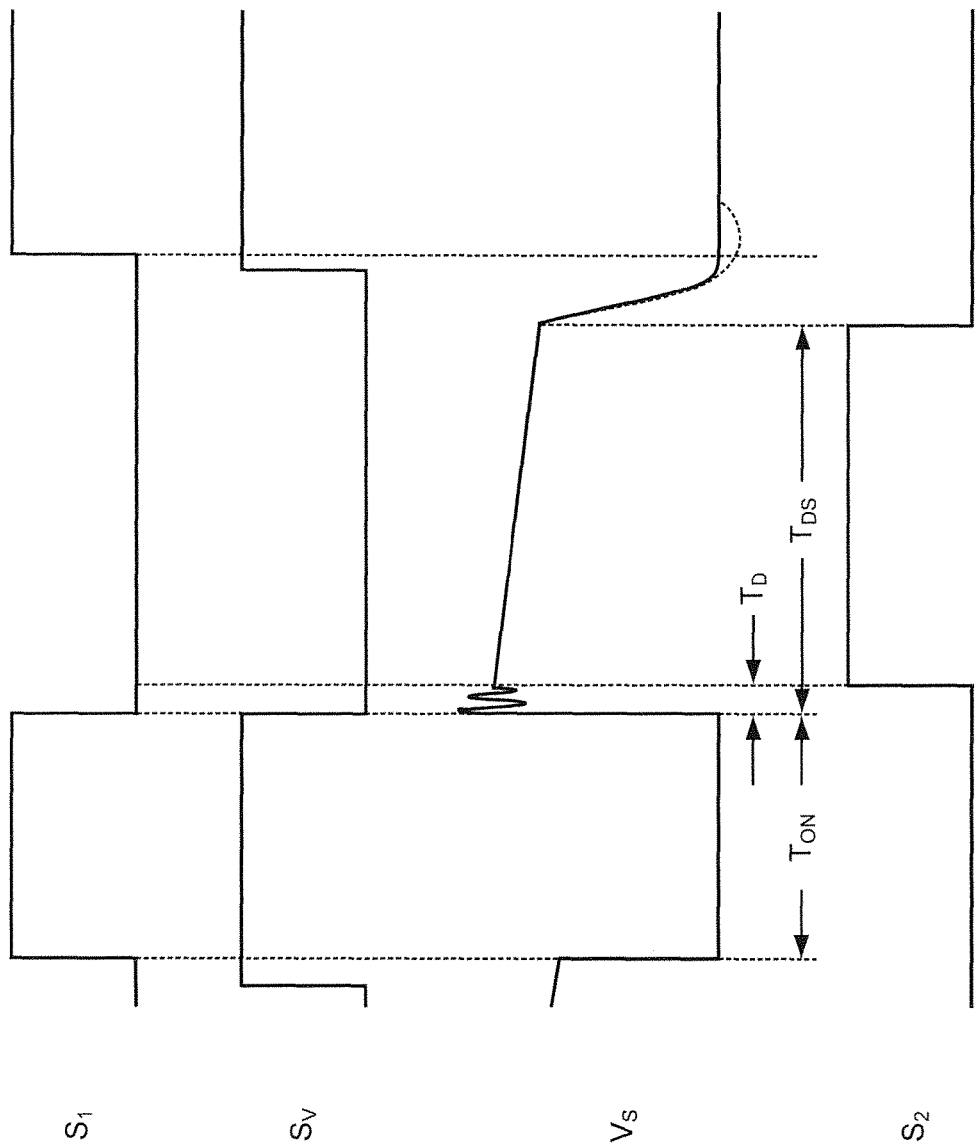
FIG. 12B shows the waveforms of the switching signal $S_1$, the valley-voltage signal $S_V$, the reflected signal $V_S$, and the active-clamp signal $S_2$ according to the present invention.

FIG. 12B shows the waveforms of the switching signal $S_1$, the valley-voltage signal $S_V$, the reflected signal $V_S$, and the active-clamp signal $S_2$ according to the present invention. The voltage waveform of the transistor 20 (as shown in FIG. 1) is correlated to the waveform of the reflected signal $V_S$. The switching signal $S_1$ is enabled in response to the valley voltage of the reflected signal $V_S$, which will achieve the soft switching to the transistor 20 in the heavy load condition. The efficiency of the power converter is thus improved by reducing the switching loss of the transistor 20.

Figure 12C:
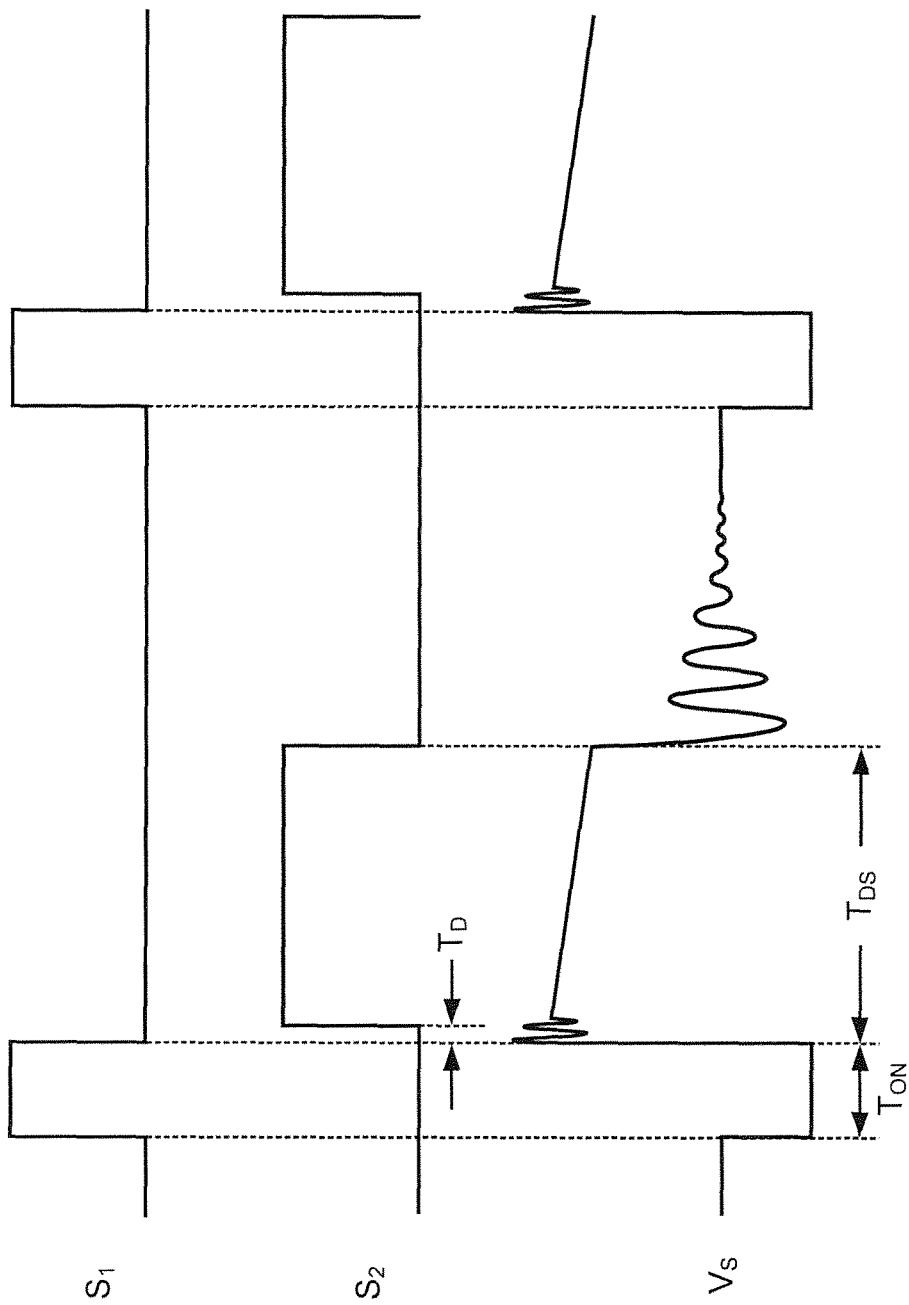
FIG. 12C shows the waveforms of the switching signal $S_1$, the active-clamp signal $S_2$, and the reflected signal $V_S$ operated in the light load condition according to the present invention.

FIG. 12C shows the waveforms of the switching signal $S_1$, the active-clamp signal $S_2$, and the reflected signal $V_S$ operated in the light load condition according to the present invention. The discharge (demagnetizing) time of the transformer 10 (as shown in FIG. 1) determines the pulse width of the active-clamp signal $S_2$. The active-clamp signal $S_2$ will be disabled before the enable of the switching signal $S_1$ for CCM and DCM operations. The efficiency of the power converter is improved by cycling the leakage inductance's energy of the transformer 10 to the output of the power converter.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a flyback power converter, comprising:

a controller configured to form a switching signal to control a low-side transistor coupled to switch a transformer;

the controller configured to form an active-clamp signal to control a high-side drive circuit that is configured to be coupled to drive an active-clamper coupled in parallel with the transformer wherein the active-clamper includes a high-side transistor coupled in series with a capacitor;

wherein the switching signal is generated in accordance with a feedback signal for regulating an output voltage of the flyback power converter and wherein the feedback signal is received by the controller and is representative of the output voltage;

the controller configured to receive a reflected signal from the transformer, the controller configured to form an input-voltage signal from the reflected signal wherein the input-voltage signal is representative of an input voltage, and also form an output-voltage signal from the reflected signal wherein the output-voltage signal is representative of an output voltage; and the controller configured to generate the active-clamp signal in response to a predicted time of the transformer; the predicted time is determined in accordance with the input-voltage signal, the output-voltage signal and the switching signal including an on time of the switching signal; the controller forms the output-voltage signal from the reflected signal during an off time period of the switching signal, and forms the input-voltage signal from the reflected signal during the on time the switching signal wherein each pulse of the active-clamp signal is generated in between at least two pulses of the switching signal and wherein during operation in a light load condition more pulses of the switching signal are formed than pulses of the active-clamp signal, and the active-clamp signal remains in an OFF status during each pulse of the switching signal.

2. The control circuit as claimed in claim 1, wherein the predicted time is further determined by a resistance of a resistor, the resistance of the resistor is correlated to a turn-ratio of the transformer.

3. The control circuit as claimed in claim 1, wherein the pulse width of the active-clamp signal is correlated to a demagnetizing time of the transformer.

4. A control circuit of a flyback power converter, comprising:

a controller configured to form a switching signal to control a low-side transistor coupled to switch a transformer;

the controller configured to form an active-clamp signal to control a high-side drive circuit that is configured to be coupled to drive an active-clamper coupled in parallel with the transformer;

wherein the switching signal is generated in accordance with a feedback signal for regulating an output voltage of the flyback power converter and wherein the feedback signal is received by the controller and is representative of the output voltage;

the controller configured to receive a reflected signal from the transformer, the controller configured to form an input-voltage signal from the reflected signal wherein the input-voltage signal is representative of an input voltage, and also form an output-voltage signal from the reflected signal wherein the output-voltage signal is representative of an output voltage; and the controller configured to generate the active-clamp signal in response to a predicted time of the transformer; the predicted time is determined in accordance with the input-voltage signal, the output-voltage signal and the switching signal including an on time of the switching signal; the controller forms the output-voltage signal from the reflected signal during an off time period of the switching signal, and forms the input-voltage signal from the reflected signal during the on time the switching signal wherein during operation in a light load condition three or more pulses of the switching signal are formed for one pulse of the active-clamp signal and wherein each pulse of the active-clamp signal is generated in between at least two pulses of the switching signal, and the active-clamp signal remains in an OFF status during each pulse of the switching signal.

5. The control circuit as claimed in claim 1, wherein the controller is configured to generate the switching signal in response to the predicted time of the transformer.

6. The control circuit as claimed in claim 1, wherein the predicted time of the transformer is related to a demagnetizing time of the transformer.

7. The control circuit as claimed in claim 1, wherein the controller includes:
   a predict-time signal generation circuit to generate a predict-time signal in response to the reflected signal of the transformer and the switching signal; in which the predict-time signal represents the predicted time of the transformer;
   a turn-on circuit configured to generate a turn-on signal in response to the predict-time signal for generating the switching signal; and
   an active-clamp signal generation circuit configured to generate the active-clamp signal in response to the predict-time signal.

8. The control circuit as claimed in claim 1, wherein the switching signal is enabled in response to a clock signal in a CCM operation; the clock signal is generated by an oscillation circuit of the controller.

9. The control circuit as claimed in claim 1, wherein the active-clamp signal is disabled in response to a pulse signal in a CCM operation; the pulse signal is generated by an oscillation circuit of the controller; the pulse signal is generated before the enable of a clock signal generated by the oscillation circuit.

10. A method for controlling a flyback power converter with an active-clamper coupled in parallel with a transformer, comprising:
   configuring a control circuit to generate a switching signal in accordance with a feedback signal for switching a low-side transistor coupled to switch the transformer, regulating an output voltage of the flyback power converter; and
   configuring the control circuit to generate receive a reflected signal from the transformer and to form an output-voltage signal and an input-voltage signal from the reflected signal wherein the output-voltage signal is representative of the output voltage and the input-voltage signal is representative of the input voltage;
   configuring the control circuit to generate an active-clamp signal to control a high-side transistor of the active-clamper in accordance with an on time of the switching signal, the input-voltage signal, and the output-voltage signal; and
   configuring the control circuit to operate in a light load mode and to form more pulses of the switching signal than pulses of the active-clamp signal wherein each pulse of the active-clamp signal is generated in between at least two pulses of the switching signal, and the active-clamp signal remains in an OFF status during said at least two pulses of the switching signal.

11. The method as claimed in claim 10, including configuring the control circuit to form the active-clamp signal in accordance with a resistance of a resistor wherein the resistance of the resistor is correlated to a turn-ratio of the transformer.

12. The method as claimed in claim 10, including configuring the control circuit to form the active-clamp signal in accordance with the reflected signal of the transformer.

13. The method as claimed in claim 10, including configuring the control circuit to operate in a light load mode and to form three or more pulses of the switching signal for one pulse of the active-clamp signal wherein each pulse of the active-clamp signal is generated in between at least two pulses of the switching signal, and the active-clamp signal remains in an OFF status during said at least two pulses of the switching signal.

14. The method as claimed in claim 10, including configuring the control circuit to enable the switching signal in response to a valley voltage of the reflected signal of the transformer in a heavy load condition wherein the active-clamp signal is disabled in response to a pulse signal in a CCM operation and the active-clamp signal is disabled before the enable of the switching signal.

15. The method of claim 10 further including configuring the control circuit to receive a feedback signal that is representative of the output voltage and to use the feedback signal to form the switching signal.

16. The control circuit of claim 1 wherein the one terminal of the capacitor of the active-clamper is coupled to a terminal of the transformer and a current carrying electrode of the high-side transistor is coupled to another terminal of the transformer.

17. The control circuit of claim 1 wherein the controller is configured to operate in a normal mode wherein there is at least one pulse of the active-clamp signal for each pulse of the switching signal.

18. The control circuit of claim 1 wherein the active-clamp signal controls the high-side transistor.

19. The method of claim 10 further including configuring a capacitor of the active-clamper to have one terminal coupled to a terminal of the transformer, wherein a current carrying electrode of the high-side transistor is coupled to another terminal of the transformer.

* * * * *